(12) United States Patent
Dybro

(10) Patent No.: US 11,008,055 B2
(45) Date of Patent: May 18, 2021

(54) TRACK MANAGEMENT SYSTEM FOR USE WITH A WORK MACHINE AND TRACK ASSEMBLY

(71) Applicant: DEERE & COMPANY, Moline, IL (US)

(72) Inventor: Niels Dybro, Sherrard, IL (US)

(73) Assignee: DEERE & COMPANY, Moline, IL (US)

( * ) Notice: Subject to any disclaimer, the term of this patent is extended or adjusted under 35 U.S.C. 154(b) by 302 days.

(21) Appl. No.: 16/196,052

(22) Filed: Nov. 20, 2018

(65) Prior Publication Data
US 2020/0156720 A1 May 21, 2020

(51) Int. Cl.
*B62D 55/084* (2006.01)
*B62D 55/116* (2006.01)
*B62D 55/065* (2006.01)

(52) U.S. Cl.
CPC .......... *B62D 55/084* (2013.01); *B62D 55/116* (2013.01); *B62D 55/065* (2013.01)

(58) Field of Classification Search
CPC .............................. B62D 55/112; B62D 55/116
See application file for complete search history.

(56) References Cited

U.S. PATENT DOCUMENTS

| | | | | |
|---|---|---|---|---|
| 3,289,779 | A * | 12/1966 | Feucht | E02F 9/024 180/9.5 |
| 6,564,889 | B1 * | 5/2003 | Yamazaki | B62D 55/06 180/9.54 |
| 7,690,738 | B2 * | 4/2010 | Wilt | B62D 55/116 305/133 |
| 8,180,532 | B2 * | 5/2012 | O'Halloran | B60G 17/0165 701/49 |
| 9,394,015 | B2 * | 7/2016 | Cox | B62D 55/10 |
| 10,065,691 | B2 * | 9/2018 | Missotten | A01D 41/12 |
| 2001/0025732 | A1 | 10/2001 | Lykken et al. | |
| 2015/0367901 | A1 * | 12/2015 | Studer | B62D 55/116 180/9.42 |
| 2016/0280292 | A1 | 9/2016 | Satzler | |
| 2017/0291653 | A1 * | 10/2017 | Hruska | B62D 49/0628 |
| 2019/0359269 | A1 * | 11/2019 | Hellholm | B62D 55/116 |

FOREIGN PATENT DOCUMENTS

| | | |
|---|---|---|
| DE | 102014110551 A1 | 1/2016 |
| DE | 102018118908 A1 | 2/2020 |
| WO | WO2015110373 A1 | 7/2015 |

OTHER PUBLICATIONS

German Search Report issued in counterpart application No. 102019216132.4 dated Dec. 2, 2020 (12 pages).

* cited by examiner

*Primary Examiner* — Kevin Hurley

(57) ABSTRACT

Track management system for use with a work machine and a track assembly that is pivotably coupled thereto at a pivot point. The track management system includes a first mount, a second mount, and an actuator. The first mount is coupled to the work machine, and the second mount is coupled to the track assembly. The actuator includes a first portion that is coupled to the first mount and a second portion that is coupled to the second mount. Expanding the actuator urges the track assembly about the pivot point in a first direction, while retracting the actuator urges the track assembly about the pivot point a second direction that is opposite of the first direction.

20 Claims, 11 Drawing Sheets

US 11,008,055 B2
// 1

TRACK MANAGEMENT SYSTEM FOR USE WITH A WORK MACHINE AND TRACK ASSEMBLY

FIELD OF THE DISCLOSURE

The present disclosure relates to a track management system for use with a work machine and track assembly. More specifically, the present disclosure relates to a track management system that includes an actuator that urges the track assembly about a pivot point.

BACKGROUND

Some work machines include track assemblies. When a draft load is applied to this kind a work machine, a torque may be simultaneously applied about a pivot point of the track assembly. This torque shifts the vertical loading from a leading idler to a trailing idler, creating an imbalance therebetween. Because of this, the rear of the track assembly may receive significantly higher upward ground forces than the front of the track assembly. This imbalance reduces the traction between the track assembly and the ground, and further it causes the track assembly to tip (i.e., knuckle) relative to the ground. Some known track assemblies are designed asymmetrically relative to a vertical plane that intersects the pivot point, such that a trailing side of the track assembly protrudes further from the vertical plane than does the leading side. While such designs advantageously reduce the maximum imbalance at high draft loads, they disadvantageously increase the imbalance at low draft loads.

SUMMARY

Disclosed is a track management system for use with a work machine and a track assembly pivotably coupled thereto at a pivot point. The track management system includes a first mount, a second mount, and an actuator. The first mount is coupled to the work machine, and the second mount is coupled to the track assembly. The actuator includes a first portion that is coupled to the first mount and a second portion that is coupled to the second mount. Expanding the actuator urges the track assembly about the pivot point in a first direction, while retracting the actuator urges the track assembly about the pivot point in a second direction that is opposite of the first direction.

The actuator is configured to extend and retract in response to changing ground surface levels under the track assembly, so as to move the track assembly about the pivot point and aid in engaging the track assembly with the ground surface. This may ensure that the bottom of the track assembly is level with the ground (i.e., not tipping or knuckling). And further, this may ensure that the bottom of the track assembly and the ground engage with one another, so as to maximize the tractive forces therebetween.

The actuator may be further configured to proportion bias levels thereof with draft loads of the work machine. More specifically, the actuator may be configured to supply increasing bias forces in response to increasing draft loads and decreasing bias forces in response to decreasing draft loads. This approach may be used to balance forces applied to the track assembly behind the pivot point relative to forces applied to the track assembly in front of the pivot point. In some embodiments, the biasing forces may be used to equalize the force applied to a rear idler of the track assembly and the force applied to a front idler.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
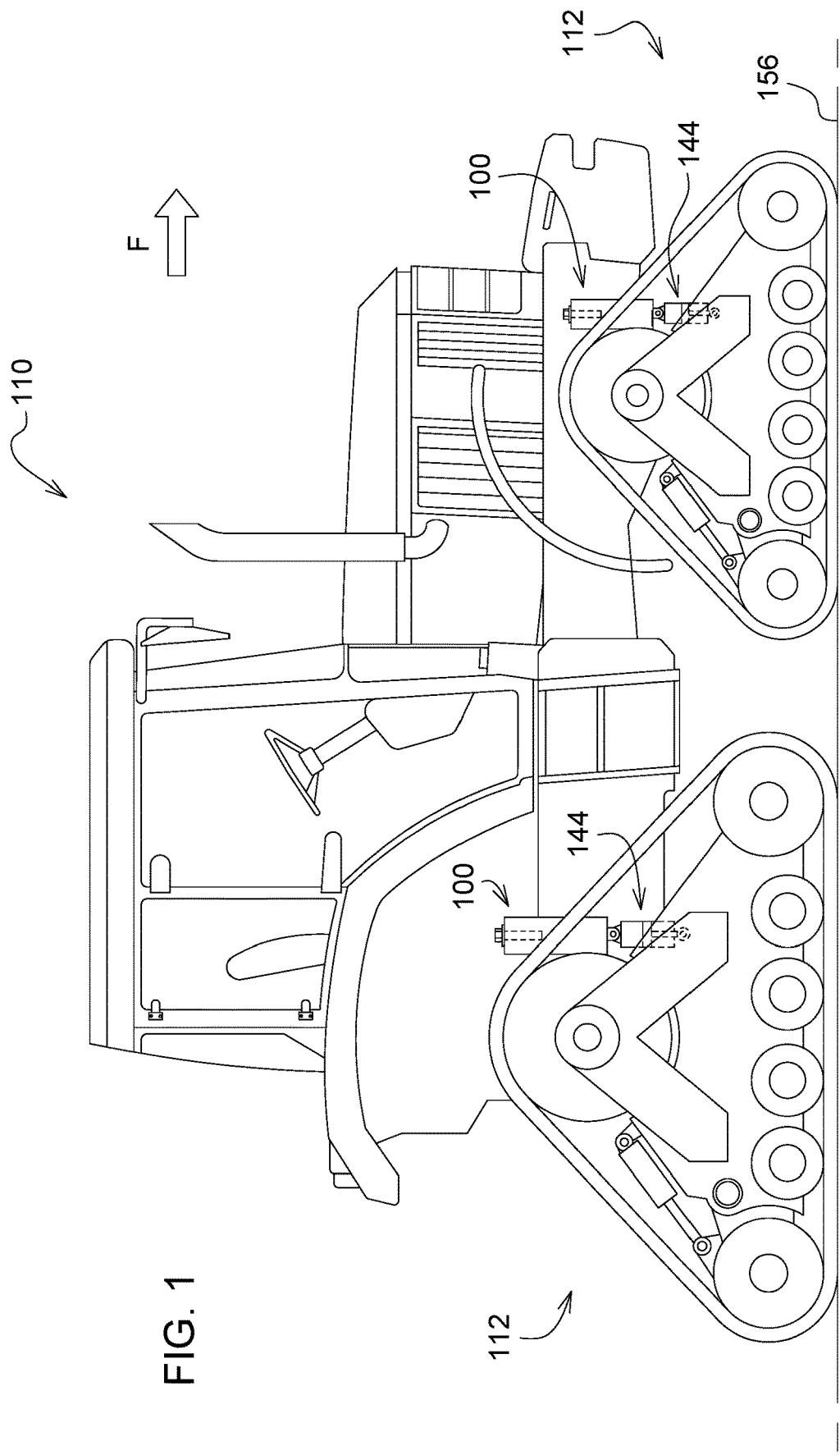
FIG. 1 is a side view of a work machine, a pair of track assemblies, and a pair of track management systems.

Referring to FIG. 1, there is shown a perspective view of a work machine 110, and it includes four track assemblies 112 and four track management systems 100 (though only two of each are visible herein). As illustrated, the work machine 110 may be an agricultural tractor. In other embodiments, the work machine 110 may be an agricultural machine, an agricultural harvester, an agricultural implement, a construction machine, a forestry machine, an off-road vehicle, an all-terrain side-by-side vehicle, an all-terrain straddle vehicle, or a number of other kinds of work machines.

The work machine 110 may include a main frame 116, four drive axles 118, and four axle housings 120. Other embodiments of the work machine 110 may include a different number of drive axles 118 and respective axle housings 120. Further, the work machine 110 may include four track assemblies 112 and four respective track management systems 100. However, other embodiments of the work machine 110 may include a different number of track assemblies 112 and a different number of respective track management systems 100. The work machine 110 may include an equal number of track assemblies 112 and track management systems 100 (e.g., one for one), or alternatively there may be track assemblies 112 that do not include track management systems 100 (e.g., track management systems 100 are only used on the rear of the work machine 110, or alternatively only in the front).

The track assembly 112 may include a drive sprocket 122, a first idler 124, a second idler 126, a plurality of mid-roller wheels 128, a main frame 116, a tensioner 130, and a track 132. The drive sprocket 122 may be directly coupled for rotation with the drive axle 118 and may engage with drive lugs of the track 132. In other embodiments, the drive sprocket 122 may be driven by the drive axle 118 via, for example, a pair of gears, so as to create an offset between the drive sprocket 122 and the drive axle 118. Among other things, the offset may be used to raise or lower the height of the work machine 110 relative to the ground 156.

The track 132 may be wrapped around the drive sprocket 122, the first idler 124, the second idler 126, and the mid-roller wheels 128, and it may form a triangle when viewed from a side of the work machine 110. The upper corner of the triangle may be defined by the drive sprocket 122, a first lower corner of the triangle may be defined by the first idler 124, and the second lower corner of the triangle may be defined by the second idler 126. In other embodiments, the track assembly 112 may form a shape other than a triangle (e.g., a shape with four or more sides).

The main frame 116 may be rotatably coupled to the drive axle 118, and the first idler 124, the second idler 126, and mid-roller wheels 128 may be rotatably coupled to the main frame 116. The mid-roller wheels 128 may be coupled to double isolating bogies, so as to improve the contact between the track assembly 112 and the ground 156, to improve the power transfer provided by the track assembly 112, and to improve the stability of the work machine 110.

The tensioner 130 may be coupled to the main frame 116 and to either the first idler 124 or the second idler 126, and the tensioner 130 may be configured to control the tension in the track 132. Controlling the tension therein may ensure proper contact between the drive sprocket 122 and the drive lugs, thereby extending the life and improving the performance of the track 132. Exemplarily, the tensioner 130 may be a hydraulic tensioner with a nitrogen-charged accumulator to maintain the tension in the track 132.

The track assembly 112 may be pivotably coupled to the work machine 110 at a pivot point 134. As shown in the illustrated embodiment, the drive sprocket 122 and the drive axle 118 define an axis 138, and the axis 138 intersects the pivot point 134. Aftermarket providers of track assemblies 112 may use this pivot point 134, so that their track assemblies 112 can be easily installed in the place of wheels. Likewise, track assemblies 112 available directly from work machine manufacturers (i.e., already installed on a new work machine) may use this pivot point 134 for the same reason.

In other embodiments, it may be just the drive sprocket 122 that defines the axis 138 that intersects the pivot point 134, or it may be just the drive axle 118 that defines the axis 138 that intersects the pivot point 134. Or in yet other embodiments, neither the drive sprocket 122 nor the drive axle 118 may define the axis 138 that intersects the pivot point 134. For example, in some track assemblies 112, the pivot point 134 may be a lower pivot point, which is set below the drive sprocket 122, below the drive axle 118, or below both the drive sprocket 122 and the drive axle 118. In such track assemblies 112, the main frame 116 may be coupled to an upper frame via the lower pivot point.

As shown in FIGS. 2-5, the track management system 100 may include a first mount 140, a second mount 142, and an actuator 144. The first mount 140 is coupled to the work machine 110, while the second mount 142 is coupled to the track assembly 112. The actuator 144 includes a first portion 146 that is coupled to the first mount 140 and a second portion 148 that is coupled to the second mount 142. The first portion 146 may be coupled to the first mount 140 in front of the pivot point 134, while the second portion 148 may be coupled to the second mount 142 in front of the pivot point 134 and below the pivot point 134. In some embodiments of the track management system 100, the first portion 146 of the actuator 144 may be the first end thereof, and the second portion 148 of the actuator 144 may be the second end thereof.

The actuator 144 may be a mechanical actuator, a hydraulic actuator, an electric actuator, a pneumatic actuator, a hydraulic linear actuator, an electric linear actuator, an electric motor, or a hydraulic motor, just to name a few examples.

The actuator 144 includes a part 150 that is grounded and a part 152 that extends and retracts relative the part 150 that is grounded. As illustrated, the part 150 that is grounded may be pivotably coupled to the first mount 140, while the part 152 that extends and retracts may be pivotably coupled to the second mount 142. The illustrated embodiment may provide convenient options for providing power to the actuator 144 from the work machine 110 and/or for providing control related signals to the actuator 144 from the work machine 110. But still, in other embodiments, the part 150 that is grounded and the part 152 that extends and retracts may be flipped relative to what is illustrated herein.

Expanding the actuator 144 urges the track assembly 112 about the pivot point 134 in a first direction 1D, while retracting the actuator 144 urges the track assembly 112 about the pivot point 134 in a second direction 2D that is opposite of the first direction 1D. More specifically, the first and second directions 1D, 2D may be rotationally opposite directions. For example, if the actuator 144 is positioned in front of the pivot point 134, then expanding the actuator 144 urges the track assembly 112 in a clockwise direction, while retracting the actuator 144 urges the track assembly 112 in a counter-clockwise direction. And as an alternative example, if the actuator 144 is positioned behind the pivot point 134, then expanding the actuator 144 urges the track assembly 112 in a counter-clockwise direction, and retracting the actuator 144 urges the track assembly 112 in a clockwise direction.

Figure 2:
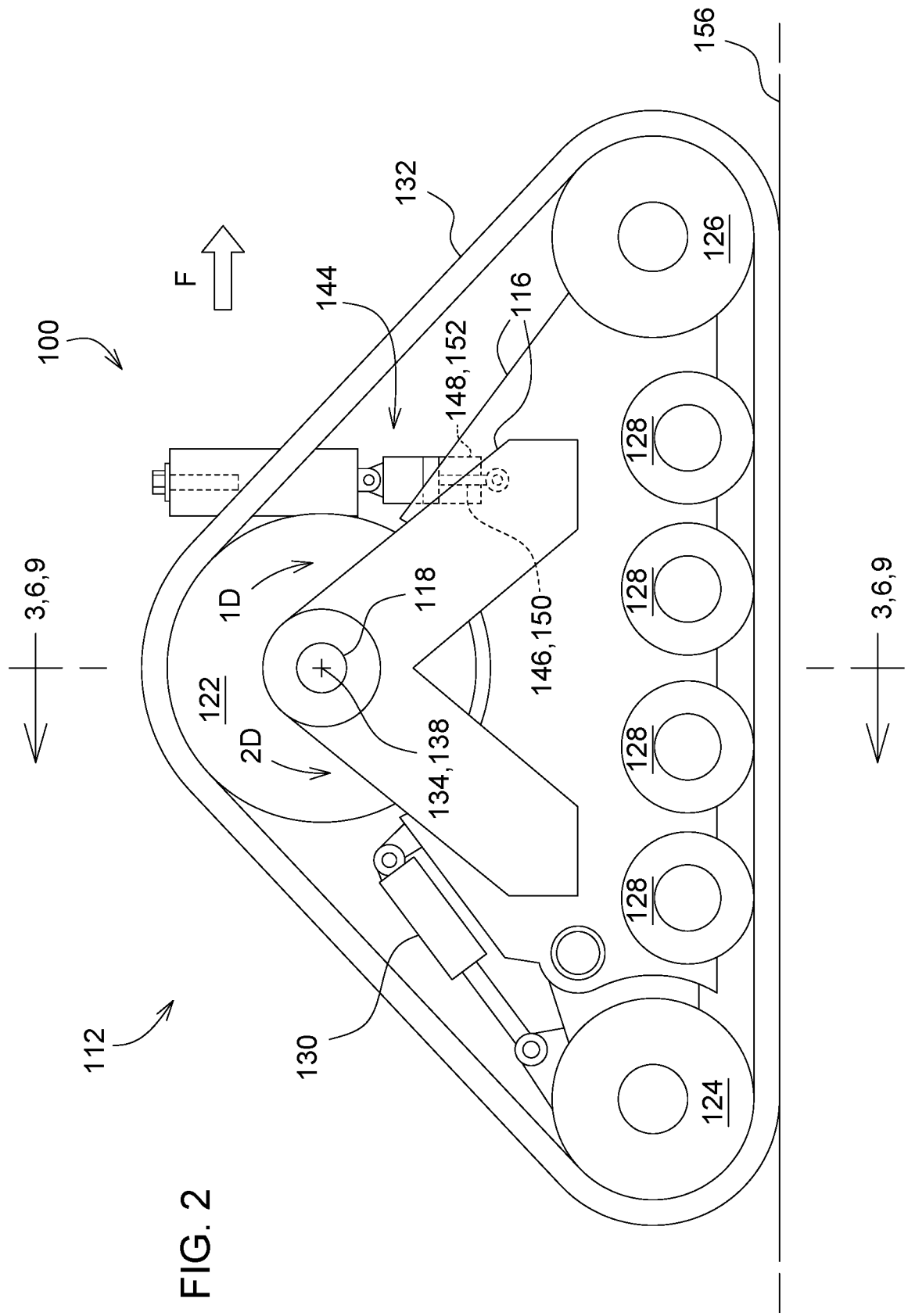
FIG. 2 is a side view of one of the track assemblies and its respective track management system.

As shown in FIG. 2, the actuator 144 may be positioned substantially vertically when viewed from a side of the work machine 110 (i.e., elevational view). In this context, substantially vertically means that the actuator 144 forms an angle between 70 degrees and 110 degrees relative to the ground 156. In this orientation, small extensions and retractions of the actuator 144 may result in comparatively large and beneficial levels of rotation of the track assembly 112.

Figure 3:
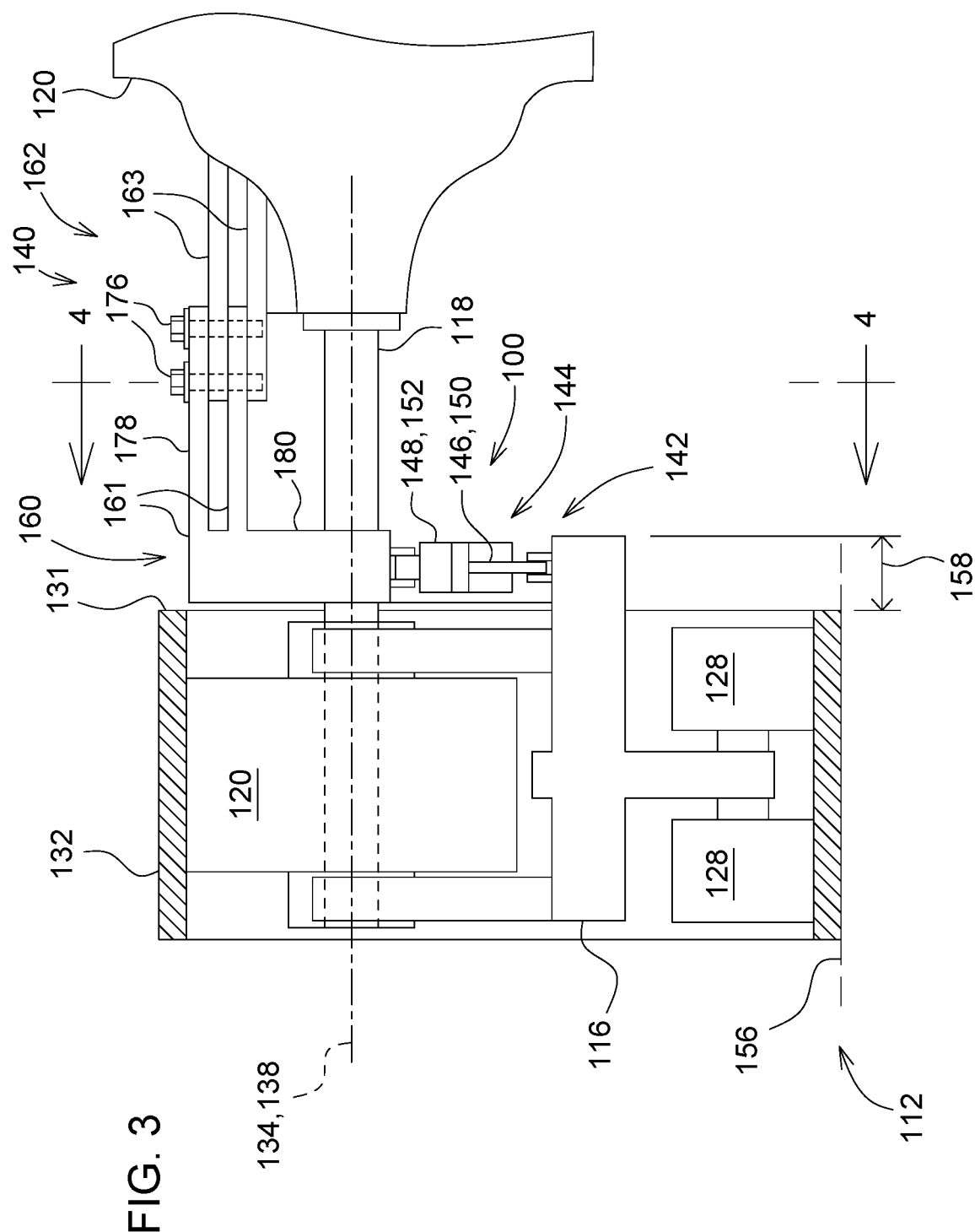
FIG. 3 is a partial sectional view taken along lines 3-3 of FIG. 2, showing the track management system.

As shown in FIG. 3, the actuator 144 may be positioned substantially vertically when viewed from in front of the work machine 110 (e.g., elevational view). In this context, substantially vertically means that the actuator 144 forms an angle between 70 degrees and 110 degrees relative to the ground 156. And in this orientation, the actuator 144 is spaced apart from both the track assembly 112 and the work machine 110, such that the actuator 144 can expand and retract without bumping into track assembly 112 and the work machine 110.

As shown in FIGS. 2-5, the first mount 140 may be directly coupled to the axle housing 120, and similarly the second mount 142 may be directly coupled to the main frame 116 of the track assembly 112. As illustrated, at least a portion of the first mount 140 may be unitarily molded into the axle housing 120 (e.g., a single casting) and/or at least a portion of the second mount 142 may be unitarily molded into the main frame 116 (e.g., a single casting). In yet other embodiments, the first mount 140 may be directly coupled or unitarily molded into to some other suitable part of the work machine 110. Other suitable parts of the work machine 110 may include the frame, the body, or some other part that is "fixed" or "grounded" so as to not rotate with the track assembly 112.

As shown in FIG. 3, the first mount 140, the actuator 144, and the second mount 142 may all be positioned at least partially inboard relative to an inboard edge 131 of the track 132. And as shown, the first mount 140 and the actuator 144 may even be positioned entirely inboard relative to an inboard edge 131 of the track 132. With this orientation, the actuator 144 can expand and retract without bumping into the track assembly 112.

As shown in FIG. 3, the first and second mounts 140, 142 may overlap in a vertical overlapping region 158 when viewed from a front elevational view of the work machine 110. In such embodiments, the first portion 146 may be coupled to the first mount 140 within the bounds of the vertical overlapping region 158. And similarly, the second portion 148 may be coupled to the second mount 142 within the bounds of the vertical overlapping region 158.

Figure 5:
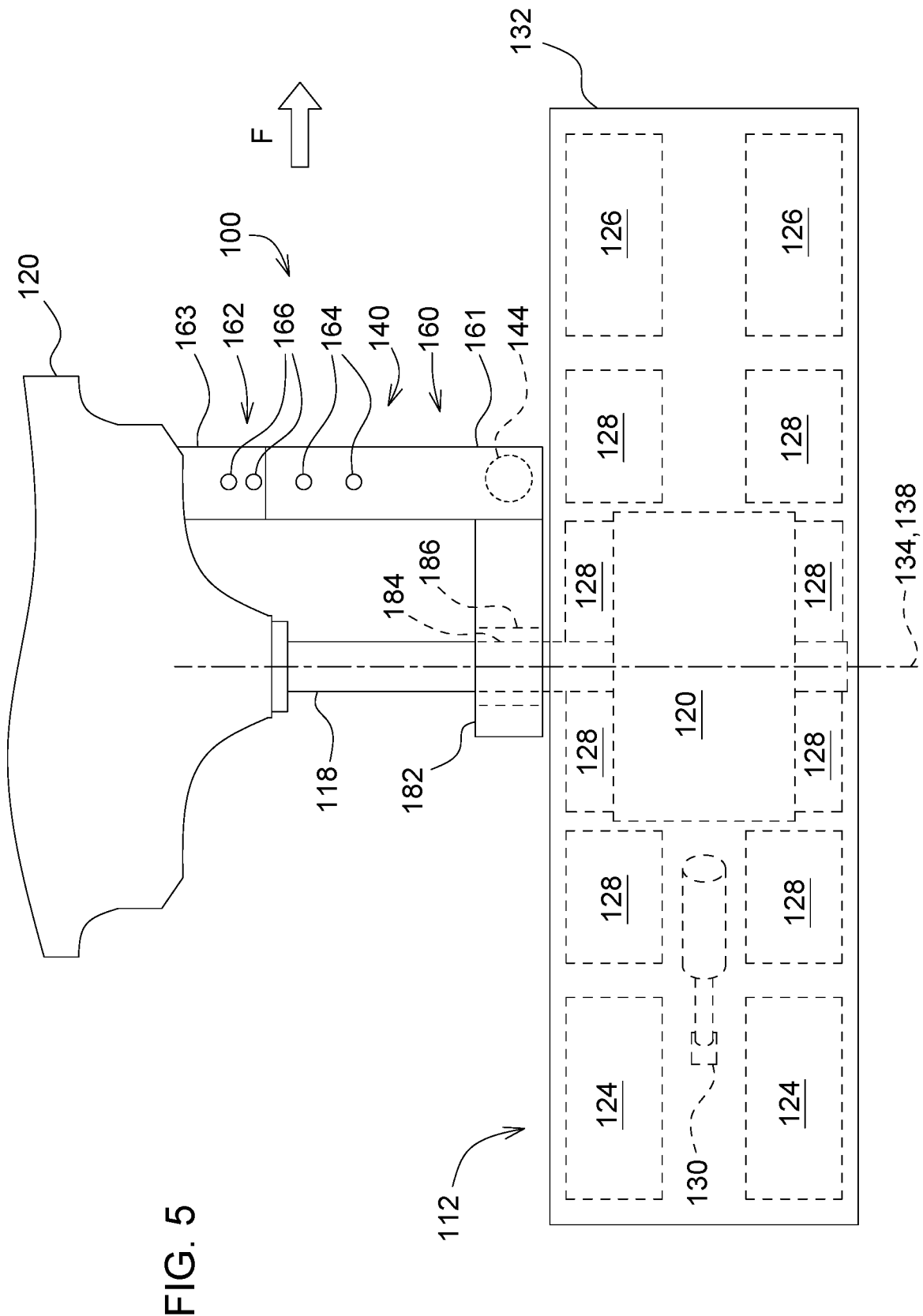
FIG. 5 is a top plan view of the track assembly and the track management system.

As shown in FIGS. 3 and 5, the first mount 140 may span transversely outwards starting from the axle housing 120, and the second mount 142 may span transversely inwards starting from the track assembly 112. By spanning the first and second mounts 140, 142 in this way, the actuator 144 may operate without bumping into the track assembly 112 and without bumping into the work machine 110 (e.g., its drive axle 118, its chassis, and its body that is coupled thereto). More specifically, the actuator 144 may not operatively bump into the track assembly 112 because it is inboard thereof, while the actuator 144 may not operatively bump into the work machine 110 because it is outboard thereof.

Figure 4:
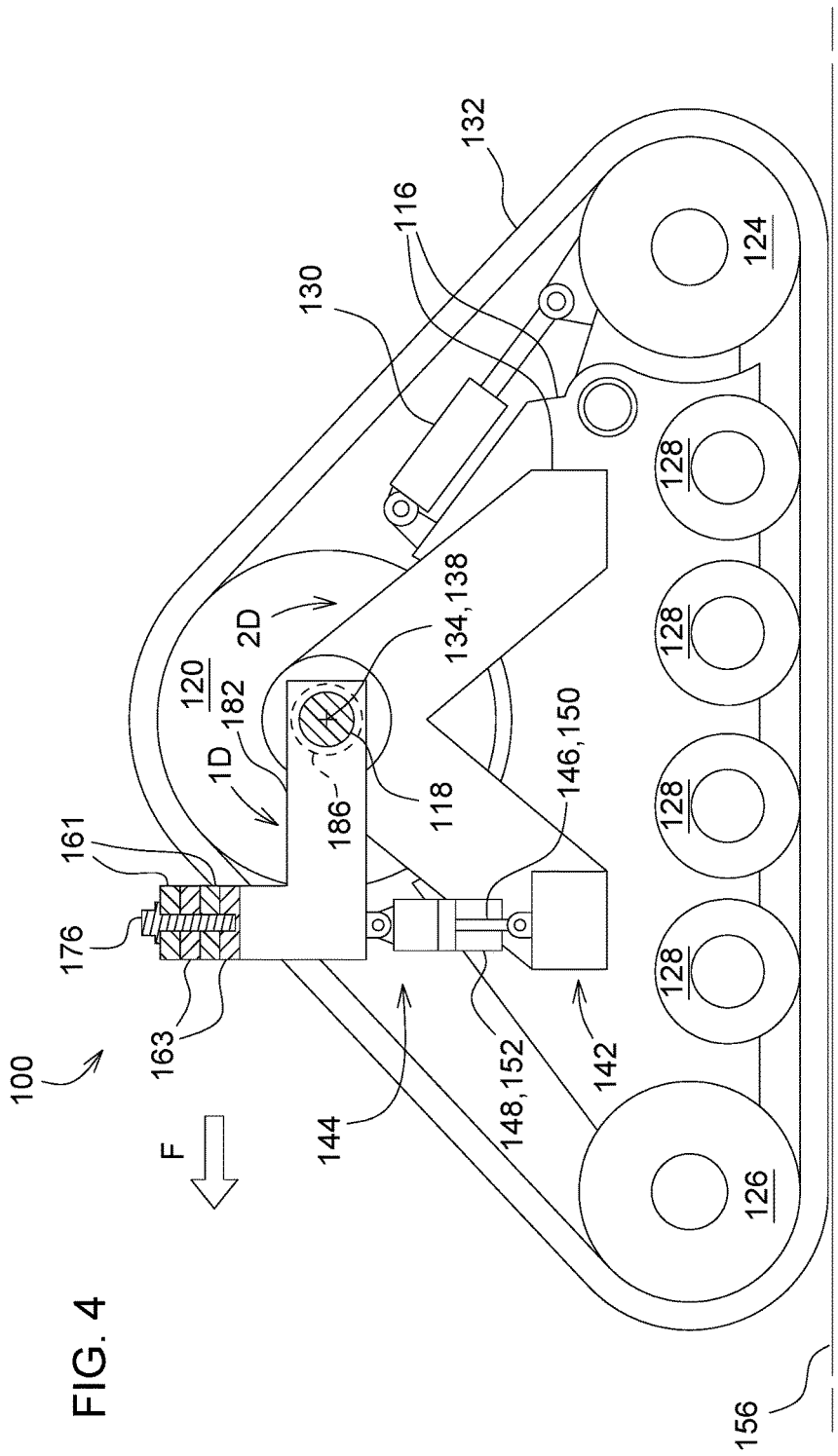
FIG. 4 is a sectional view taken along lines 4-4 of FIG. 3, showing the track assembly and track management system.

As shown in FIGS. 3-5, the first mount 140 may include an outboard member 160 and an inboard member 162. The outboard member 160 may be configured to move (e.g., via sliding or repositioning) between inward and outward positions relative to the inboard member 162. In doing this, the track assembly 112 moves in coordination with the outboard member 160 when the outboard member 160 slides from the inward position to the outward position (and vice-versa). And in contrast, the track assembly 112 moves relative to the inboard member 162 when the outboard member 160 slides from the inward position to the outward position (and vice-versa).

As shown in FIGS. 3 and 5, the outboard member 160 may include one or more holes 164, and likewise the inboard member 162 may include one or more holes 166. An inner positioning of the hole(s) 164 of the outboard member 160 relative to the hole(s) 166 of the inboard member 162 may define the inward position. And in contrast, an outer positioning of the hole(s) 164 of the outboard member 160 relative to the hole(s) 166 of the inboard member 162 may define the outward position. Intermediately positioning the hole(s) of the outboard member 160 relative to the hole(s) of the inboard member 162 may define the one or more intermediate positions. Fasteners 176 may be used to fix the outboard member 160 to the inboard member 162 (via holes 164 and 166), and to fix the outboard member 160 in the inward position, the outward position, or one of the intermediate positions. With the flexibility associated with these different positions, an operator, for example, may widen and narrow the track assembly 112, yet maintain the functionality of the track management system 100.

As shown in FIGS. 3-5, the outboard member 160 may include a pair of tabs 161 and the inboard member 162 may include a pair of complimentary tabs 163. In this embodiment, the pair of tabs 161 includes the holes 164 of the outboard member 160, and the pair of complimentary tabs 163 includes the holes 166 of the inboard member 162. In other similar embodiments, the outboard member 160 may include a different number of tabs (i.e., one or more), and likewise the inboard member 162 may include a different number of tabs (i.e., one or more). As shown in FIG. 3, the outboard member 160 may include a vertical portion that is vertically aligned with the actuator 144, and the tabs 161 may extend inwardly starting from an upper part of the vertical portion.

As further shown in FIGS. 3-5, the outboard member 160 may span between the inboard member 162, the drive axle 118, and the actuator 144. To do this, the outboard member 160 may span in a transverse direction (see FIG. 3), in a vertical direction (see FIG. 3), and in a fore-and-aft direction (see FIG. 4). In some specific embodiments, the outboard member 160 may include a first outboard portion 178 that spans in the transverse direction (see FIG. 3), a second outboard portion 180 that spans in the vertical direction (see FIG. 3), and a third outboard portion 182 that spans in the fore-and-aft direction (see FIG. 4). As also illustrated, the first outboard portion 178 may be oriented horizontally and be coupled to the second outboard portion 180, the second outboard portion 180 may be oriented vertically and be coupled to the first outboard portion 178, and the third outboard portion 182 may be oriented horizontally and be coupled to the second outboard portion 180. In other embodiments, the outboard member 160 may take different shapes, may include a different number of outboard portions (e.g., one or greater), and may span between different components (e.g., between only the inboard member 162 and the actuator 144).

As illustrated, the drive axle 118 may extend through the first mount 140, such that the first mount 140 surrounds 360 degrees of a cylindrical portion 184 (see FIG. 5) of the drive axle 118. More specifically, the drive axle 118 may extend through the outboard member 160, such that the outboard member 160 surrounds 360 degrees of the cylindrical portion 184 of the drive axle 118. And even more specifically, the drive axle 118 may extend through the third outboard portion 182, such that the third outboard portion 182 surrounds 360 degrees of the cylindrical portion 184 of the drive axle 118. As shown, the drive axle 118 may rotate relative to the first mount 140 via a bearing 186, such as a roller bearing, ball bearing, or other suitable friction reducing device.

Extending the drive axle 118 through the first mount 140 enables the drive axle 118 to support the first mount 140, and this enables the first mount 140 to support the actuator 144. With such a design, the first mount 140 may be stiffer and/or use less material than may be necessary it alternative designs. In other embodiments, the drive axle 118 may not extend through the first mount 140, such that the first mount 140 may span between only the inboard member 162 and the actuator 144. Such an embodiment avoids the need for a bearing, yet may provide sufficient support for the actuator 144 to urge the track assembly 112 about the pivot point 134

Figure 6:
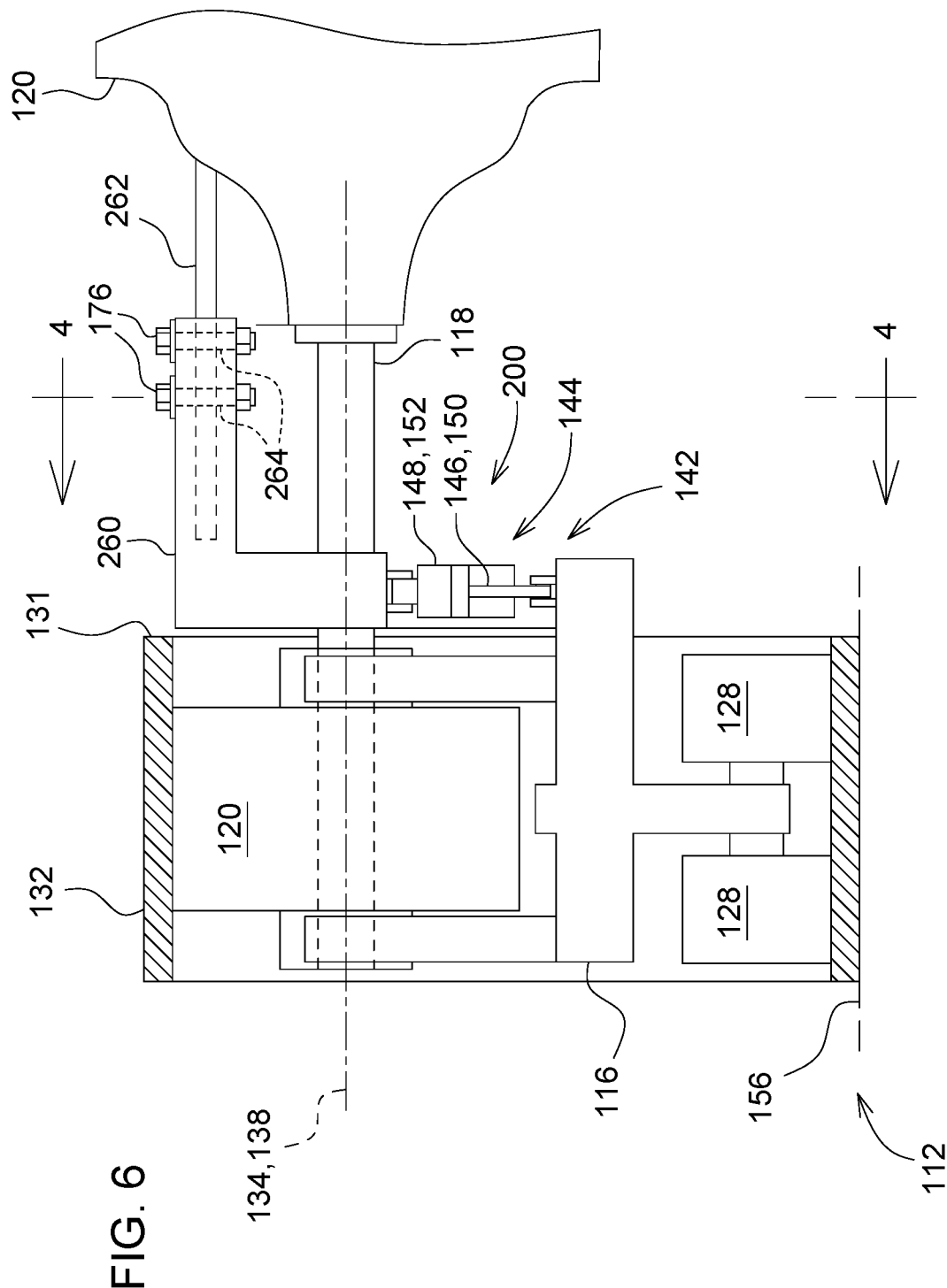
FIG. 6 is a partial sectional view taken along lines 6-6 of FIG. 2, but showing a second track management system.
Figure 7:
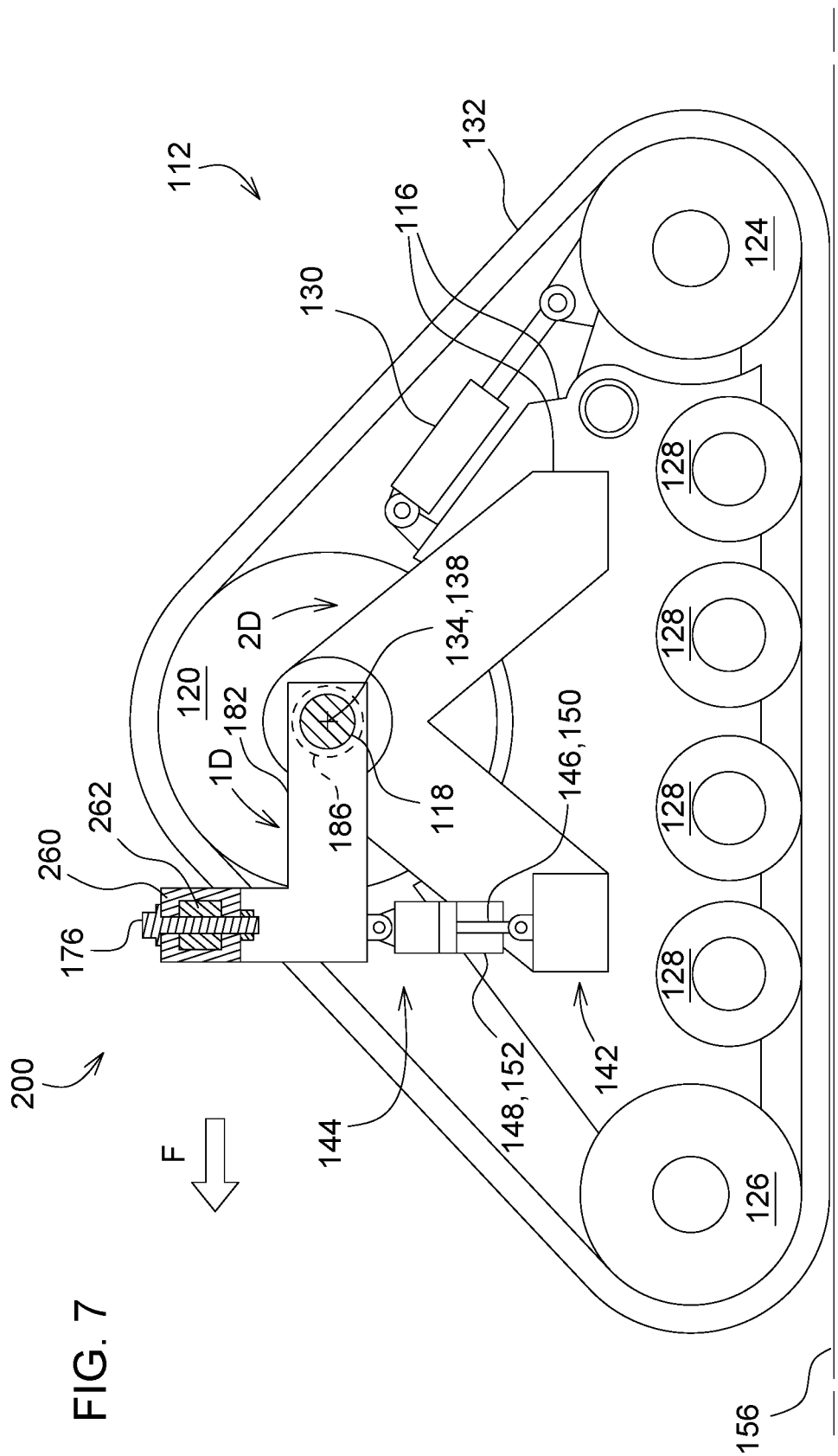
FIG. 7 is a sectional view taken along lines 7-7 of FIG. 6, showing the track assembly and second track management system.
Figure 8:
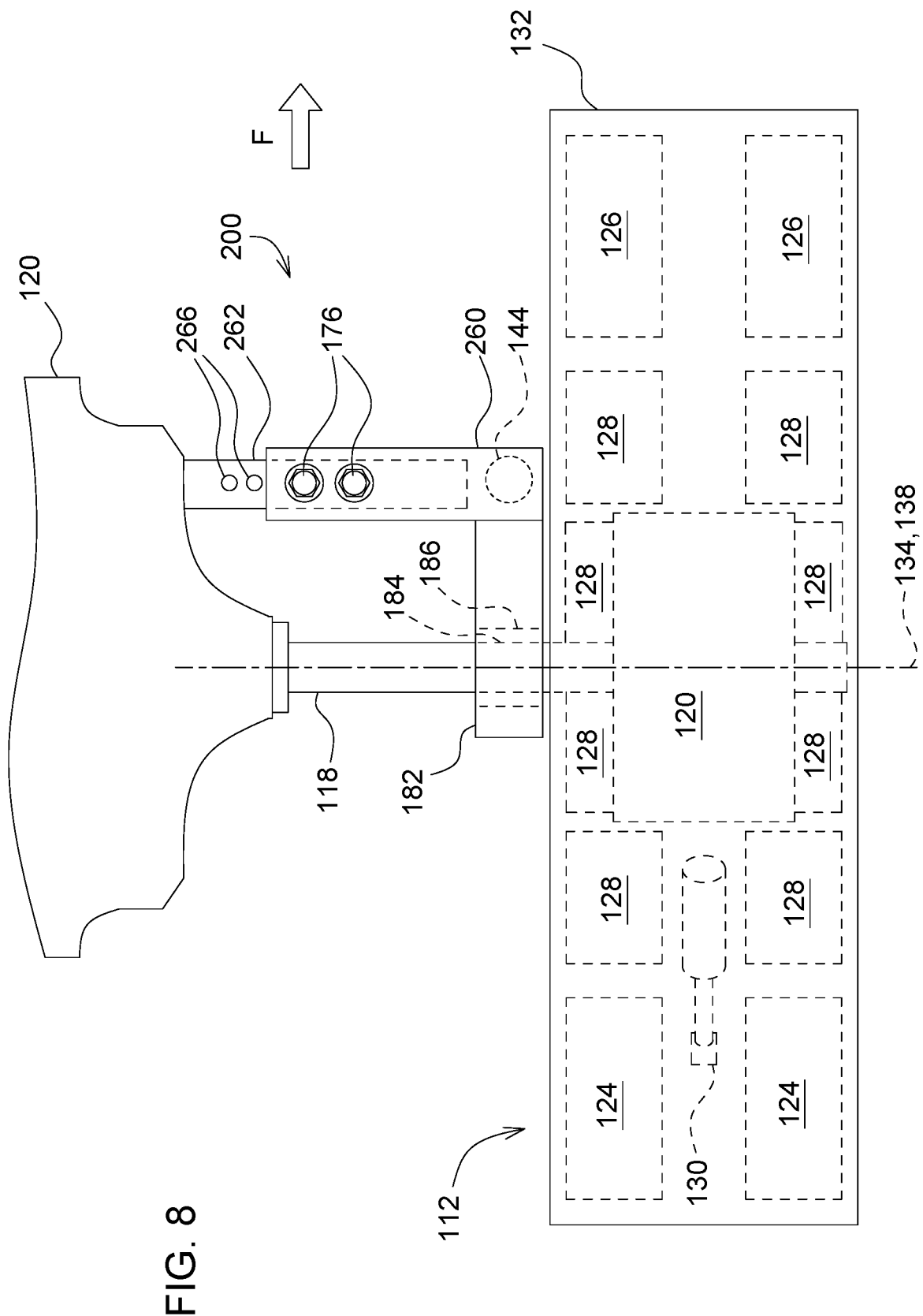
FIG. 8 is a top plan view of the track assembly and the second track management system.

As shown in FIGS. 6-8, there is a second track management system 200. In the second track management system 200, the outboard member 260 is a tube, and the inboard member 262 is a shaft that is positioned inside of the tube. In related, but opposite, embodiments, the inboard member 262 may be the tube, and the outboard member 260 may be the shaft that is positioned inside of the tube. The illustrated tube and shaft are square shaped, but other tubes and shafts may take different shapes. And further, the illustrated tube surrounds the portions of the shaft that are positioned inside of the tube, but other tube and shafts may not be designed in this way.

As illustrated, the tube includes the holes 264 of the outboard member 160, and the shaft includes the holes 266 of the inboard member 262. The outboard member 260 (and thus the track assembly 112) may be positioned in an inward position, an outward position, and one or more intermediate positions therebetween. These positions may be defined by which holes 264 of the outboard member 260 are aligned with which holes 266 of the inboard member 262 (i.e., by the operator, manufacturer, or service person). With this flexibility, the operator, for example, may widen and narrow the track assembly 112, yet maintain the functionality of the second track management system 200.

Figure 9:
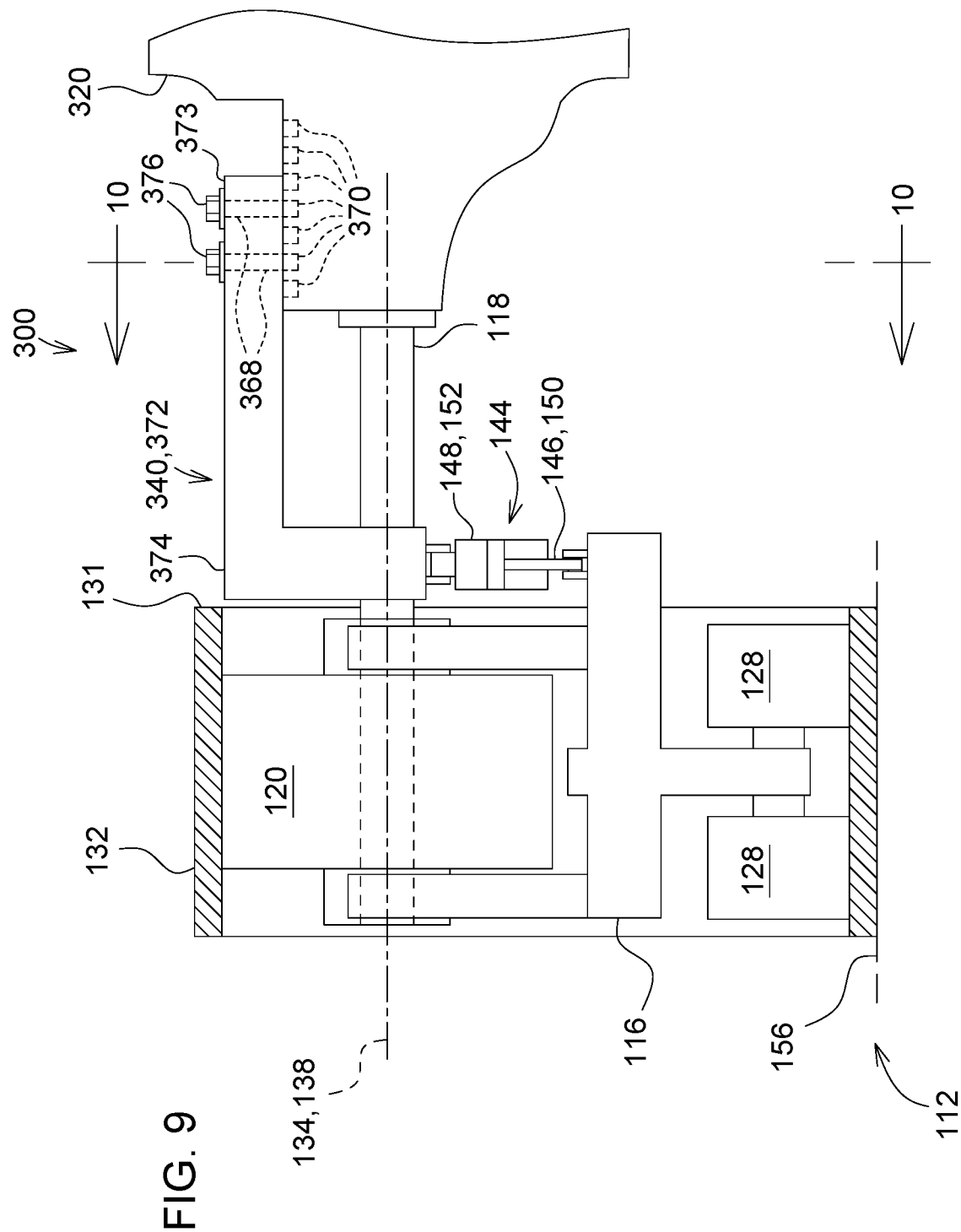
FIG. 9 is a partial sectional view taken along lines 9-9 of FIG. 2, but showing a third track management system.
Figure 10:
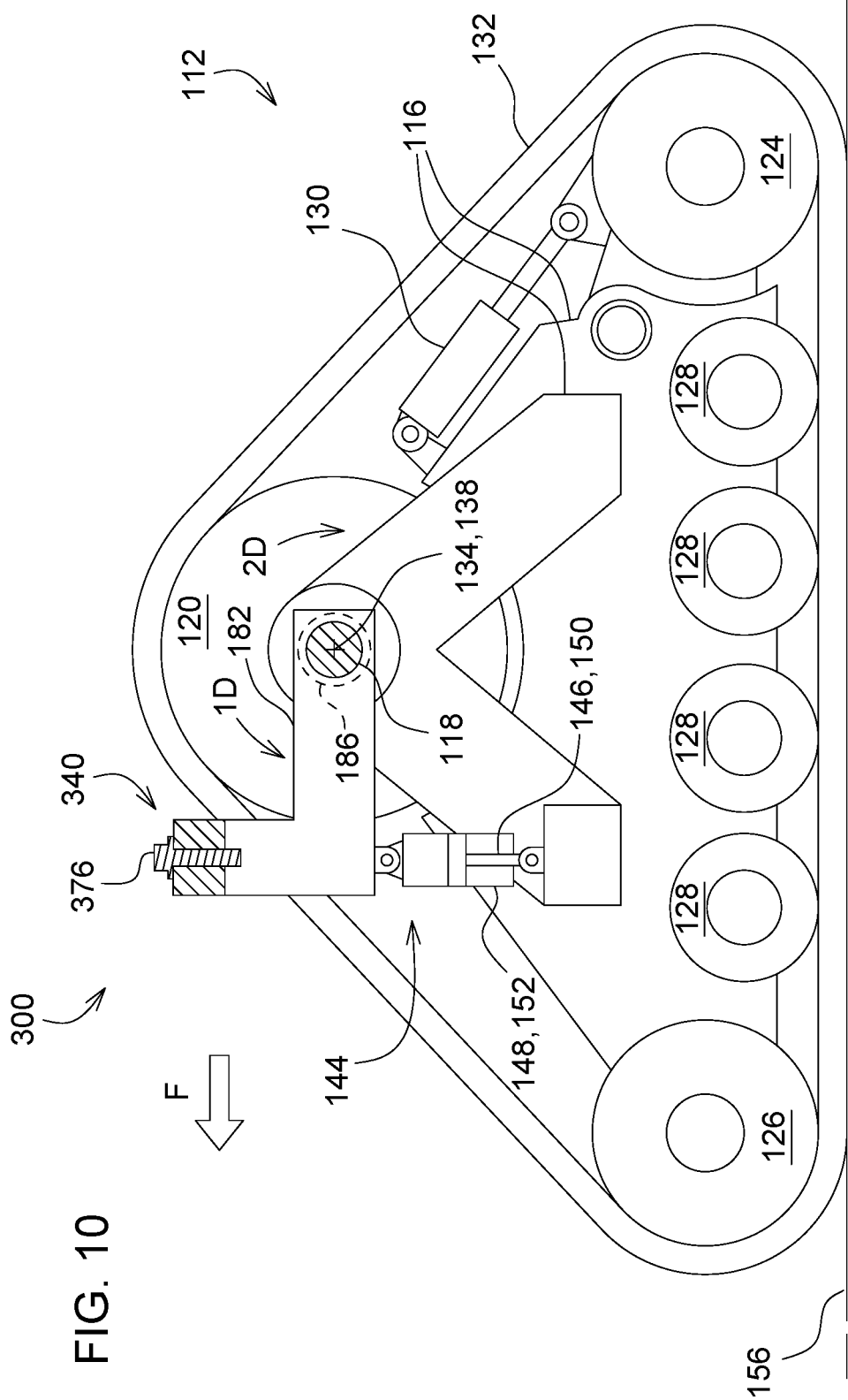
FIG. 10 is a sectional view taken along lines 10-10 of FIG. 9, showing the track assembly and third track management system.
Figure 11:
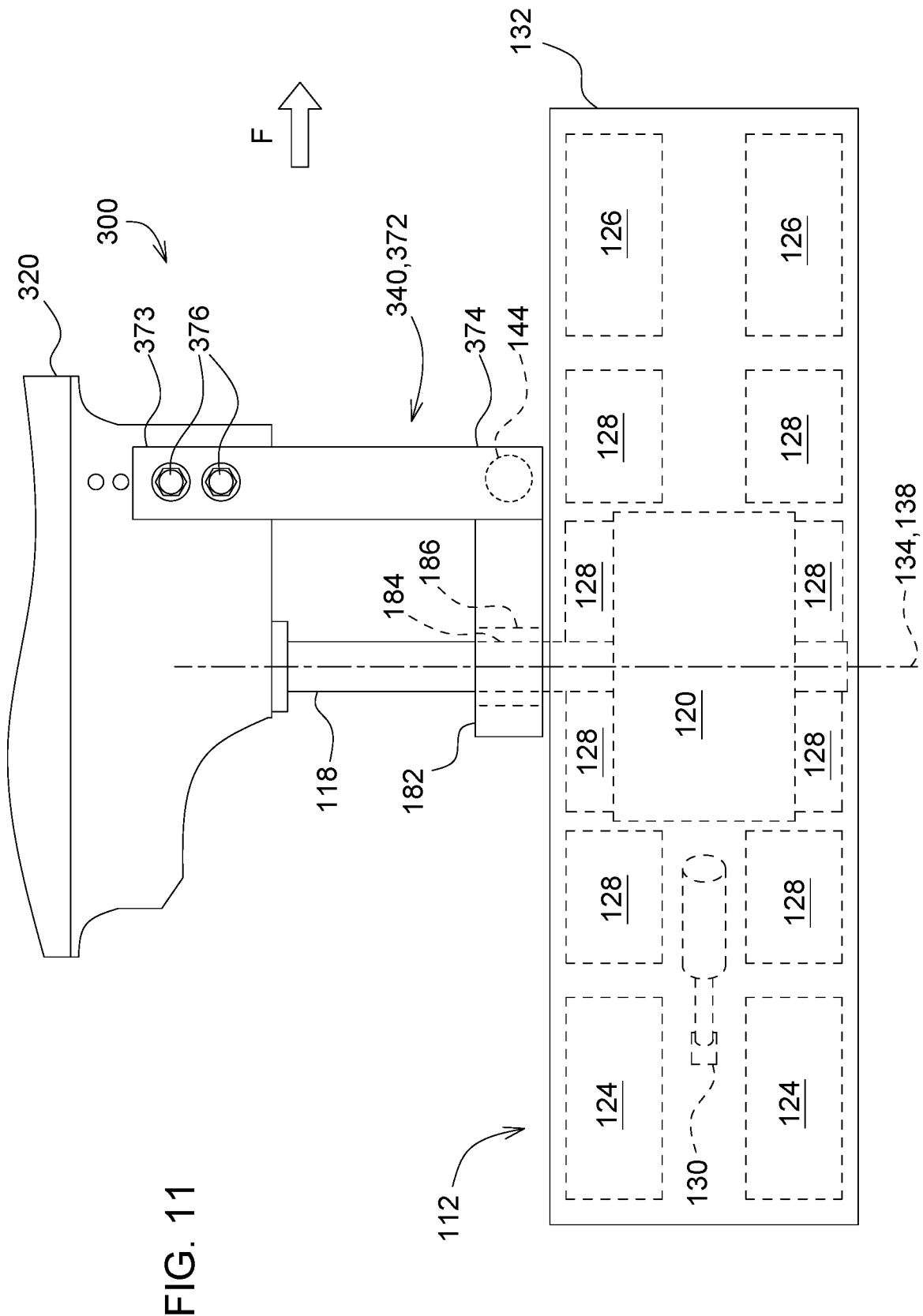
FIG. 11 is a top plan view of the track assembly and the third track management system.

As shown in FIGS. 9-11, there is a third track management system 300. In the third track management system 300, the first mount 340 may include one or more holes 368, and the axle housing 320 may include one or more holes 370. In such an embodiment, the first mount 340 may be repositionable between an inward position, an outward position, and intermediate positions relative to the axle housing 320. These positions may be defined by which holes 368 of the first mount 340 are aligned with which holes 370 of the axle housing 320 (e.g., by the owner, manufacturer, or service person). In the illustrated embodiment, an inner positioning of the holes 368 relative to the holes 370 may define the inward position. And in contrast, an outer positioning of the holes 368 relative to the holes 370 may define the outward position. With this flexibility, the operator, for example, may widen and narrow the track assembly 112, yet maintain the functionality of the third track management system 300.

As shown in FIGS. 9, the first mount 340 may include a horizontal member 372 having an inboard region 373 and an outboard region 374. The inboard region 373 may be rigidly coupled to the axle housing 320, using the one or more holes 368 of the first mount 340, the one or more holes 370 of the axle housing 320, and one or more fasteners 376. The first portion 146 of the actuator 144 may be pivotably coupled to the outboard region 374, and the second portion 148 of the actuator 144 may be pivotably coupled to the second mount 142.

In some other embodiments of the first mount—instead of having inboard and outboard regions 373, 374—the first mount may include a rear portion that is coupled to a front of the axle housing 320, and it may further include a front axle portion that is coupled to the actuator 144. In such an example, the second mount may span inwards starting from the track assembly 112, so as to move inwards towards the front axle portion, sometimes even far enough to overlap the front portion as viewed from in front of the work machine 110. If there is a vertical overlapping region, then the actuator 144 may be oriented substantially vertically therein. In this context, substantially vertically means that 70% or more of the actuator 144 is positioned in the vertical oriented overlapping region.

As shown in FIGS. 1-11 and in the embodiments therein, in operation, the track assembly 112 may be configured to receive upward forces from the ground 156 that are applied behind the pivot point 134, and configured to receive upward forces from the ground 156 that are applied in front of the pivot point 134. Further, in operation, work machine pulling forces, known as draft loads, generate torque about the pivot point 134.

The actuator 144 may be configured to extend and retract in response to changing levels (e.g., slope changes) of the ground 156 relative to the track assembly 112. This rotates the track assembly 112 about the pivot point 134, and increases the traction between the track assembly 112 and the ground 156. Specifically, if the actuator 144 is coupled to the track assembly 112 in front of the pivot point 134, then the actuator 144 may be configured to extend in response to the level of the ground 156 sloping downwards relative the track assembly 112 (i.e., the ground 156 slopes downwards more than the track assembly 112 slopes downwards). And further, the actuator 144 may be configured to retract in response to the level of the ground 156 sloping upwards relative to the track assembly 112 (i.e., the ground slopes upwards more than the track assembly slopes upwards). In embodiments where the actuator 144 is coupled to the track assembly 112 behind the pivot point 134, the actuator 144 may extend and retract in an opposite manner. Regardless of the configuration, the actuator 144 may extend and retract to keep the track assembly 112 level with the ground surface. Otherwise, without such extensions and retractions, the track assembly 112 may knuckle upwards or downwards relative to the ground 156, particularly when the pivot point 134 is positioned as shown herein.

In some embodiments, if the actuator 144 is coupled to the track assembly 112 in front of the pivot point 134, then the actuator 144 may be configured to (1) extend in response to forces from the ground 156 that are applied behind the pivot point 134 to the track assembly 112 being greater than the forces from the ground 156 that are applied in front of the pivot point 134, and (2) retract in response to forces from the ground 156 that are applied behind the pivot point 134 to the track assembly 112 being less than the forces from the ground 156 that are applied in front of the pivot point 134. Such configurations and responses increase the traction between the track 132 and the ground 156, and decreasing the tendency of the track assembly 112 to knuckle.

In some embodiments, the actuator 144 may be configured to apply a biasing force in response to changing draft loads. Biasing forces are the applied by the actuator 144 to the track assembly 112. More specifically, in the illustrated embodiment, for example, part 152 of the track assembly 112 applies the biasing force to the second mount 142, and the second mount 142 applies the biasing force to the track assembly 112.

Controlling the biasing forces may prevent rotation of the track assembly about the pivot point 134, despite varying draft loads and varying torques about the pivot point 134. For example, if the work machine 110 is traveling in a forward direction F and if the actuator 144 is coupled to the track assembly 112 in front of the pivot point 134, then the actuator 144 may be configured to apply (1) an increased biasing force in response to increased work machine draft loads and torques about the pivot point 134, and (2) a decreased biasing force in response to decreased draft loads and torques. By doing this, the torque generated around the pivot point may be balanced with respect to the biasing force. Further, by doing this, the actuator 144 may balance the forces that are applied to the track assembly 112 behind the pivot point 134 relative to those applied in front of the pivot point 134. And further yet, by doing this, the traction between the track 132 and the ground 156 may increase, and the tendency of the track assembly 112 to knuckle may decrease.

The detailed description in connection with the appended drawings is intended as a description of various embodiments of the described subject matter and is not necessarily intended to represent the only embodiment(s). Any reference in the specification to "one embodiment" or "an embodiment" means that a particular feature, structure, characteristic, operation, or function described in connection with an embodiment is included in at least one embodiment. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments, and it is intended that embodiments of the described subject matter can and do cover modifications and variations of the described embodiments.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Further, it will be understood that terms such as "left," "right," "up," "down," "top," "bottom," "front," "rear," "side," "height," "length," "width," "upper," "lower," "interior," "exterior," "inner," "outer," and the like that may be used herein, merely describe points of reference and do not necessarily limit embodiments of the described subject matter to any particular orientation or configuration. And still further, it will be understood that like numbers refer to like elements throughout this detailed description.

What is claimed is:

1. A track management system for use with a work machine and a track assembly pivotably coupled thereto at a pivot point, the track management system comprising:
   a first mount coupled to the work machine;
   a second mount coupled to the track assembly; and
   an actuator including a first portion that is coupled to the first mount and a second portion that is coupled to the second mount;
   wherein expanding the actuator urges the track assembly about the pivot point in a first direction, and retracting the actuator urges the track assembly about the pivot point in a second direction that is opposite of the first direction; and
   wherein the first mount spans in a transverse direction starting from an axle housing of the work machine, and wherein the second mount spans in the transverse direction starting from the track assembly.

2. The track management system of claim 1, wherein a drive sprocket of the track assembly and an axle of the work machine define an axis that intersects the pivot point.

3. The track management system of claim 1, wherein the first portion is coupled to the first mount in front of the pivot point, and wherein the second portion is coupled to the second mount in front of the pivot point and below the pivot point.

4. The track management system of claim 1, wherein the actuator is one of a hydraulic linear actuator and an electric linear actuator.

5. The track management system of claim 1, wherein the actuator is positioned substantially vertically when viewed from in front of the work machine.

6. The track management system of claim 1, wherein the first and second portions are positioned in front of the pivot point, and wherein the actuator is positioned substantially vertically when viewed from in front of the work machine and also when viewed from a side of the work machine.

7. The track management system of claim 1, wherein the actuator includes a part that is grounded and a part that extends and retracts relative to the part that is grounded, wherein the part that is grounded is pivotably coupled to the first mount, and wherein the part that extends and retracts is pivotably coupled to the second mount.

8. The track management system of claim 1, wherein the first mount, the actuator, and the second mount are all positioned at least partially inboard relative to an inboard edge of a track of the track assembly.

9. The track management system of claim 1, wherein the actuator is configured to extend and retract in response to changing ground surface levels under the track assembly, so as to move the track assembly about the pivot point and aid in engaging the track assembly with the ground surface.

10. The track management system of claim 1, wherein the actuator is configured to proportion bias levels thereof with draft loads of the work machine.

11. The track management system of claim 1, wherein the actuator is configured to supply increasing bias forces in response to increasing draft loads and decreasing bias forces in response to decreasing draft loads, so as to aid in balancing forces applied to the track assembly behind the pivot point relative to forces applied to the track assembly in front of the pivot point.

12. The track management system of claim 1, wherein the actuator is configured to supply increasing bias forces in response to forces from a ground surface that are applied behind the pivot point being greater than the forces from the ground surface that are applied in front of the pivot point, and wherein the actuator is configured to supply decreasing bias forces in response to the forces from the ground surface that are applied behind the pivot point to the track assembly being less than the forces from the ground surface that are applied in front of the pivot point.

13. The track management system of claim 1, wherein the actuator is configured to proportion bias forces thereof with torques generated about the pivot point.

14. The track management system of claim 1, wherein the actuator is configured to supply increasing bias forces in response to increasing torques about the pivot point, wherein the actuator is configured to supply decreasing bias forces in response to decreasing torques about the pivot point, and wherein the torques are caused by work machine draft loads.

15. A track management system for use with a work machine and a track assembly pivotably coupled thereto at a pivot point, the track management system comprising:
   a first mount coupled to the work machine;
   a second mount coupled to the track assembly; and
   an actuator including a first portion that is coupled to the first mount and a second portion that is coupled to the second mount;
   wherein expanding the actuator urges the track assembly about the pivot point in a first direction, and retracting the actuator urges the track assembly about the pivot point in a second direction that is opposite of the first direction; and
   wherein the first mount is directly coupled to an axle housing of the work machine via a first set of fasteners, and wherein the second mount is directly coupled to a main frame of the track assembly via a second set of fasteners.

16. A track management system for use with a work machine and a track assembly pivotably coupled thereto at a pivot point, the track management system comprising:
   a first mount coupled to the work machine;
   a second mount coupled to the track assembly; and
   an actuator including a first portion that is coupled to the first mount and a second portion that is coupled to the second mount;

wherein expanding the actuator urges the track assembly about the pivot point in a first direction, and retracting the actuator urges the track assembly about the pivot point in a second direction that is opposite of the first direction; and wherein the first mount includes a horizontal member having an inboard region and an outboard region, wherein the inboard region is rigidly coupled to an axle housing of the work machine, wherein the outboard region is pivotably coupled to the first portion of the actuator, and wherein the second portion of the actuator is pivotably coupled to the second mount.

17. A track management system for use with a work machine and a track assembly pivotably coupled thereto at a pivot point, the track management system comprising:
a first mount coupled to the work machine;
a second mount coupled to the track assembly; and
an actuator including a first portion that is coupled to the first mount and a second portion that is coupled to the second mount;
wherein expanding the actuator urges the track assembly about the pivot point in a first direction, and retracting the actuator urges the track assembly about the pivot point in a second direction that is opposite of the first direction;
wherein the first mount includes a first set of holes;
wherein an axle housing of the work machine includes a second set of holes; and
wherein the first mount is configured to be repositionable between inward and outward positions relative to the axle housing, in which an inner positioning of the first set of holes relative to the second set of holes defines the inward position, and an outer positioning of the first set of holes relative to the second set of holes defines the outward position.

18. A track management system for use with a work machine and a track assembly pivotably coupled thereto at a pivot point, the track management system comprising:
a first mount coupled to the work machine;
a second mount coupled to the track assembly; and
an actuator including a first portion that is coupled to the first mount and a second portion that is coupled to the second mount;
wherein expanding the actuator urges the track assembly about the pivot point in a first direction, and retracting the actuator urges the track assembly about the pivot point in a second direction that is opposite of the first direction;
wherein the first mount includes an outboard member and an inboard member;
wherein the outboard member is movable relative to an axle housing of the work machine and includes one or more holes;
wherein the inboard member is fixed relative to the axle housing and includes one or more holes; and
wherein the outboard member is configured to be repositionable between inward and outward positions relative to the inboard member, in which an inner positioning of the one or more holes of the outboard member relative to the one or more holes of the inboard member define the inward position, and an outer positioning of the one or more holes of the outboard member relative to the one or more holes of the inboard member define the outward position.

19. A track management system for use with a work machine and a track assembly pivotably coupled thereto at a pivot point, the track management system comprising:
a first mount coupled to the work machine;
a second mount coupled to the track assembly; and
an actuator including a first portion that is coupled to the first mount and a second portion that is coupled to the second mount;
wherein expanding the actuator urges the track assembly about the pivot point in a first direction, and retracting the actuator urges the track assembly about the pivot point in a second direction that is opposite of the first direction;
wherein the first mount includes an outboard member and an inboard member;
wherein the outboard member is configured to slide between inward and outward positions relative to the inboard member;
wherein the track assembly moves in coordination with the outboard member when the outboard member slides from the inward position to the outward position and vice-versa; and
wherein the track assembly moves relative to the inboard member when the outboard member slides from the inward position to the outward position and vice-versa.

20. A track management system for use with a work machine and a track assembly pivotably coupled thereto at a pivot point, the track management system comprising:
a first mount coupled to the work machine;
a second mount coupled to the track assembly; and
an actuator including a first portion that is coupled to the first mount and a second portion that is coupled to the second mount;
wherein expanding the actuator urges the track assembly about the pivot point in a first direction, and retracting the actuator urges the track assembly about the pivot point in a second direction that is opposite of the first direction; and
wherein the first mount surrounds 360 degrees of a cylindrical portion of a drive axle of the work machine.

\* \* \* \* \*